United States Patent Office 3,189,809
Patented June 15, 1965

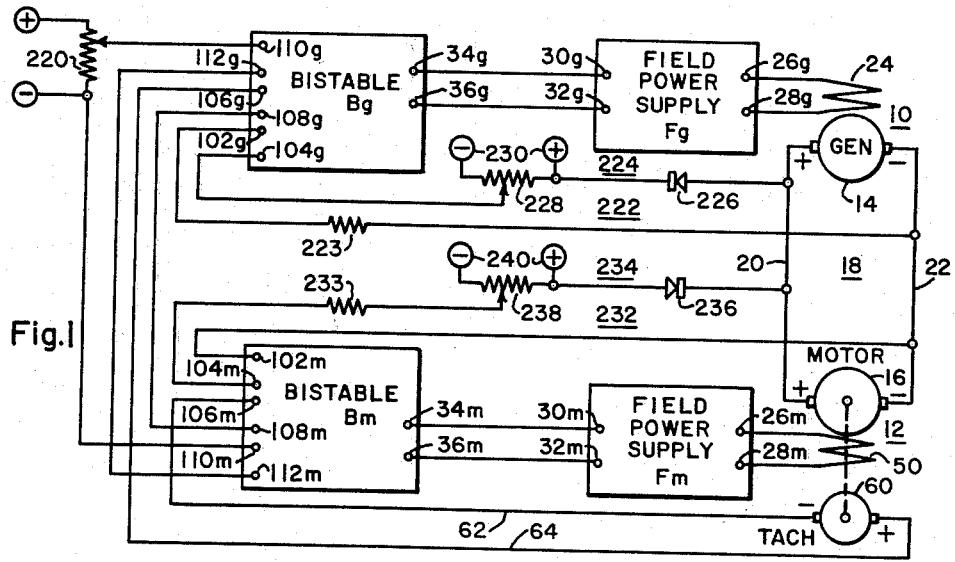
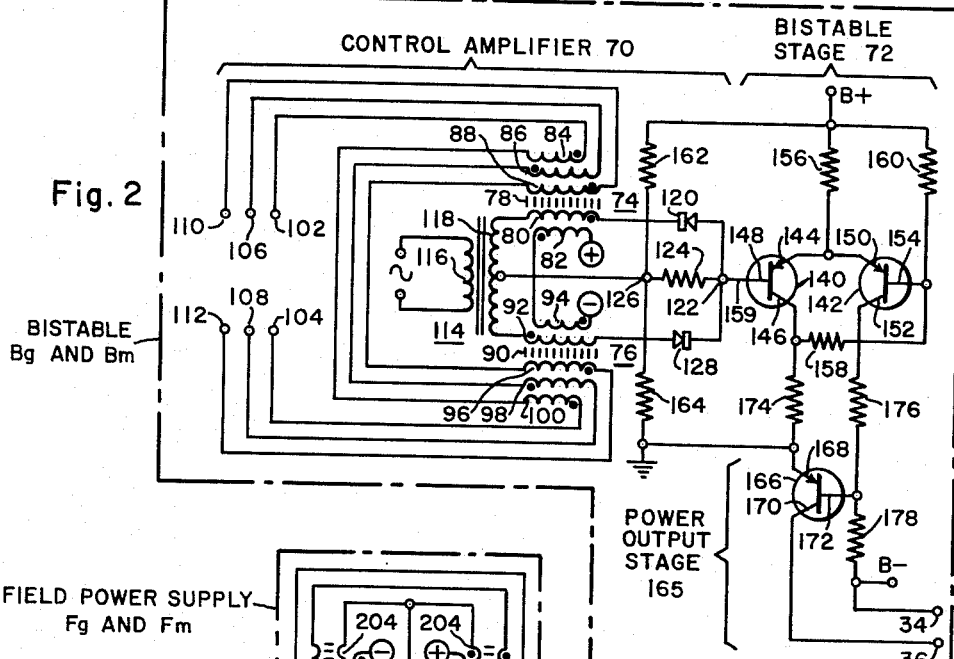
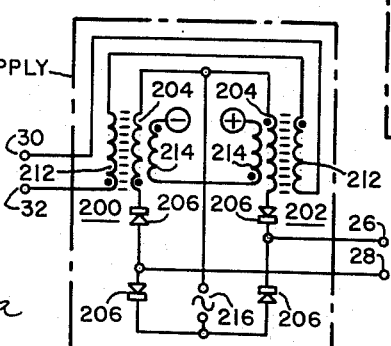
Fig. 1
Fig. 2
Fig. 3
INVENTOR
Keith H. Sueker

3,189,809
GENERATOR-FED MOTOR CONTROL WITH BISTABLE FIELD CONTROL OF GENERATOR AND MOTOR
Keith H. Sueker, Penn Hills Township, Allegheny County, Pa., assignor to Westinghouse Electric Corporation, East Pittsburgh, Pa., a corporation of Pennsylvania
Filed Sept. 28, 1961, Ser. No. 141,512
15 Claims. (Cl. 318—145)

This invention relates to control systems for electrodynamic machines having relatively movable armature and field elements, and more particularly to speed regulation for adjustable voltage motor drives.

Certain aspects of the invention are directed to a static bistable system for regulating the speed of an adjustable voltage electric motor drive.

A static bistable system is inherently cheaper and more dependable than a proportional system since high degrees of linearity and voltage and temperature stability are not required of the various amplifiers. As long as sufficient signal exists at each stage to switch the succeeding stage between two discrete levels such as zero and another level, performance is constant.

A specific aspect of the invention is directed to a system for speed regulation of an adjustable voltage drive of the Ward-Leonard type having a motor and generator with armatures connected in a loop circuit. In this system, one static bistable loop regulates the speed of the motor by controlling the generator field in response to deviation of motor speed from a command speed when the generator voltage is below a predetermined level, and a second static bistable loop regulates the motor speed by controlling the motor field in response to deviation of motor speed from a command speed when the generator voltage is above the aforesaid predetermined level. In a more specific application, the cross-over is arranged to provide regulation concurrently by both loops in an area approaching the predetermined generator voltage level.

In one embodiment, the system includes magnetic amplifier controlled static bistable elements.

It is therefore an object of the present invention to provide a static bistable apparatus for regulating a condition of an electrodynamic machine having relatively movable armature and field elements.

Another object is to provide an excitation control system having two states of operation providing two discrete levels of operation for regulating a condition that responds to an electrodynamic machine with relatively movable armature and field elements. Such a condition may for example be the output voltage of a generator, the speed of a motor, etc. The output voltage of a generator is a condition that responds to the generator. The speed of a motor is a condition which responds to the motor. In the case of a motor energized by a generator in a Ward-Leonard system, the speed of the motor is a condition which responds to the motor and also responds to the generator.

Another object is to provide a static bistable system for regulating the speed of an adjustable voltage motor drive.

Another object is to provide automatic crossover between speed ranges of an adjustable voltage motor drive.

Another object is to provide automatic cross-over with overlap between speed ranges.

Other and further objects of the invention will become apparent in the course of the following description taken in connection with the accompaying drawing in which a preferred form of the invention is illustrated by way of example.

In the drawings:

FIGURE 1 is a schematic diagram of an adjustable voltage motor drive embodying the invention;

FIG. 2 is a diagram of a magnetic amplifier controlled bistable which may be fitted into the bistable blocks in FIG. 1; and FIG. 3 is a diagram of a magnetic amplifier field power supply which may be inserted in each of the field power supply blocks in FIG. 1.

The system of FIG. 1 includes a generator 10 and a motor 12 with their respective armatures 14 and 16 connected in a loop circuit 18 through conductors 20 and 22. Generator 10 also includes a field winding 24 which is selectively energized at one or another of two levels from a field power supply Fg controlled by a bistable circuit Bg which switches the field power supply Fg to one or the other output level depending upon the state of the bistable. More specifically, generator field winding 24 is connected to the output terminals 26g and 28g of the field supply Fg, while control input terminals 30g and 32g of the generator field supply Fg are connected to the output terminals 34g and 36g of the bistable circuit Bg. In one stable state of the bistable circuit Bg, which may be arbitrarily referred to as the ON state, the field power supply Fg may be switched to a particular output level for example maximum output. On the other hand, the other state of the bistable circuit which may be referred to as the OFF state may be employed to switch the field power supply Fg to another output level for example zero output. By way of example, these are the relative values and conditions assigned to the circuit of FIG. 1.

Motor 12 also includes a field winding 50 connected to output terminals 26m and 28m of a field power supply source Fm which provides one or the other of two output levels to the field winding 50 depending on the state of a bistable circuit Bm whose output terminals 34m and 36m are connected to the control input terminals 30m and 32m of the field power supply Fm. In the particular example described, one stable state of bistable circuit Bm which may be termed the ON state, selects a particular output level for the field power supply Fm for example maximum output. On the other hand, the other stable state of the bistable circuit which may be termed the OFF state is employed to switch the field power supply Fm to a second output level for example zero output. A D.C. tachometer 60 is coupled to the motor 12 to provide a speed signal on lines 62 and 64 proportional to the speed of the motor 12.

Each bistable circuit includes a control section which sets the bistable circuit to one or the other of its states depending on the direction of deviation of motor speed from a selected command speed and also depending on whether or not the output voltage of generator 10 is above or below a predetermined, value, for example, rated armature voltage.

In the example described, the arrangement for bistable circuit Bg is such that when the generator output voltage is below the predetermined desired level, the bistable circuit assumes the OFF state when the motor speed exceeds a preselected command speed within a low speed range, and the ON state when the motor speed falls below the selected command speed. The bistable Bg also assumes the OFF state whenever the generator output voltage exceeds the predetermined level.

The arrangement for the bistable circuit Bm is such that when the generator output voltage is above a predetermined level, the bistable circuit assumes the OFF state when the motor speed drops below a selected command speed in the high speed range, and the ON state when the motor speed exceeds the selected command speed. Bistable circuit Bm is also ON when the generator output voltage is below a predetermined value. It is to be noted that when bistable Bm is in the OFF state, the field of the motor is weakened thereby speeding up the motor.

The static bistable circuits B*g* and B*m* may be similar and may take the form of the example shown in FIG. 2, wherein the circuit includes a pulse type output control stage such as the amplifier 70, and a bistable stage 72 which is turned ON and OFF by the amplifier 70. It will be noted that corresponding input and output elements of bistable circuits B*m* and B*g* bear the same reference numerals as the example of FIG. 2, but suffixed by the letter (*g* for generator—*m* for motor) identifying the particular bistable circuit.

The amplifier 70 comprises two self-saturating magnetic amplifiers 74 and 76. Amplifier 74 includes a saturable magnetic core 78 having inductively disposed thereon a load or gating winding 80, a bias winding 82, and three control windings 84, 86 and 88. Amplifier 76 includes a saturable magnetic core 90 having inductively disposed thereon a gating or load winding 92, a biasing winding 94, and three control windings 96, 98 and 100. In the drawing, winding relations are indicated by the polarity dot convention. That is, current flowing into the polarity dot end of the winding will drive the associated core toward positive saturation. Current flowing out of the polarity dot end of the winding will drive the saturated core away from positive saturation.

Windings 84 and 100 are connected in series-opposition in a control circuit for the amplifier having input terminals 102 and 104. Being in opposed relation, windings 84 and 100 have opposite magnetic effects on their respective cores. Windings 86 and 98 are connected in series-opposition in a control circuit having input terminals 106 and 108. Windings 88 and 96 are connected series-opposed in a control circuit having input terminals 110 and 112. The opposed connection of each series pair of control windings is indicated by the polarity dots.

A transformer 114 having a primary winding 116 and a center tapped secondary winding 118 is connected to drive the gating circuits of the amplifiers 74 and 76. The load or gating circuit of amplifier 74 comprises one-half of the center tap secondary winding 118, the gate winding 80, a gate rectifier 120, a terminal 122, a load resistor 124, and a terminal 126 connected in series. The load or gating circuit of amplifier 76 includes the other half of the center tap secondary winding 118, the gating winding 92, a gating rectifier 128, the terminal 122, the load resistor 124, and the terminal 126 connected in series.

The biasing means shown schematically in FIG. 1 for the amplifiers 74 and 76 comprises the bias windings 82 and 94 connected in series between terminals 130 and 132 of a bias source for applying a bias voltage of sufficient magnitude to cause a bias current to flow in the bias winding 82 and 94 which resets the flux level in the cores so that when no resultant control magnetomotive force is applied to the control windings, the amplifiers 74 and 76 will saturate or "fire" at 90°.

The operation of the push pull amplifier 70 is as follows. As hereinbefore described, the amplifier 70 has been biased to fire at 90° at quiescent. That is, the amplifiers 74 and 76 will fire at 90° of the same half cycle, and the voltages thereafter produced will oppose each other at the terminals 122 and 126 and thus no output voltage from the amplifier 70 will appear across the output resistor 124. Any combination of control currents through the respective control windings that advances the firing of one amplifier (from the 90° base) will retard the firing angle of the other by the same angle, thus producing a pulsed output across resistor 124 having a polarity dependent upon which amplifier fires first. The duration of the pulse is the interval between the firings of the two amplifiers.

Since the effect of magnetic mixing or summing is well known, the basic operation of amplifier 70 may be more specifically explained by considering only one control winding pair and ignoring the others. For example, if the control winding circuits 102–104 and 106–108 are left open, and control current is applied to the control circuit 110–112 with positive polarity at terminal 110, then, amplifier 74 will fire just before 90° and amplifier 76 will fire just after 90°, thus producing a small output pulse across resistor 124 of a polarity making terminal 126 positive. Reversal of the control current at terminals 110–112 will cause amplifier 76 to fire first, thus reversing the polarity of the output pulse across resistor 124 and making terminal 126 negative.

The bistable stage 72 comprises a pair of three electrode transistor devices 140 and 142. Transistor 140 includes an emitter electrode 144, a collector electrode 146 and a base electrode 148. Transistor 142 includes an emitter electrode 150, a collector electrode 152, and a base electrode 154. The emitter electrodes 144 and 150 are connected through a resistor 156 to a B+ power supply. The emitter electrodes 144 and 150 are connected through a resistor 156 to a B+ power supply. The collector electrode 146 is connected through a feedback resistor 158 to the base electrode 154 of transistor 142. The base electrode 148 of transistor 140 is connected via an input line 159 to the terminal 122. The base electrode 154 of transistor 142 is connected through a resistor 160 to the B+ power supply. A resistor 162, the terminal 126, and a resistor 164 are connected in series between the B+ supply and ground.

A power output stage 165 for the bistable circuit comprises a transistor 166 having an emitter electrode 168, a collector electrode 170, and a base electrode 172. The collector electrode 146 of transistor 140 is connected through a resistor 174 to the emitter electrode 168 which is also grounded. The collector electrode 152 of transistor 142 is connected through a resistor 176 to the base electrode 172 of transistor 166. The base electrode 172 of transistor 166 is connected through a resistor 178 to a B— terminal of the power supply. The collector electrode 170 is connected to an output terminal 36. A second output terminal 34 is connected to the B— supply.

In one of the stable states of the bistable stage 72, hereinafter referred to as the OFF state, transistors 140 and 166 are cut off and transistor 142 is conducting. Under these conditions, there is no output at terminals 34–36. The voltage dividing network comprising the resistors 162, the terminal 126 and the resistor 164, has applied a bias voltage to the base electrode 148 through the resistor 124 of a proper polarity to keep the transistor 140 biased to non-conduction. However, when the net polarity of the input control ampere turns to the amplifier 70 is such as to produce an output pulse across resistor 124 of a polarity to make terminal 122 negative, transistor 140 is biased to conduction and towards saturation. Conduction in the emitter-collector circuit of transistor 140 will feed back a signal through the resistor 158 to the base electrode 154 of the transistor 142, which is of the polarity to start driving transistor 142 towards cut off. As conduction through the emitter-collector circuit of transistor 142 decreases, the potential on the emitter electrode 144 of the transistor 140 rises. This potential rise on the emitter of transistor 140 effectively raises the bias potential between the emitter and base of transistor 140, allowing it to be driven further towards saturation. The voltage divider consisting of resistor 160, 158 and 174 biases base 154 to render transistor 142 non-conductive. The two effects just described cooperate to produce a snap action switching operation to set the bistable stage 72 to the other stable state hereinafter referred to as the ON state.

The abrupt change in the output of the bistable stage 72 biases or switches the output transistor 166 to conduction. That is, current now flows in resistor 174 and very little or no current flows through the resistor 176, biasing the transistor 166 to conduction, which allows an output to be taken in the path including the B— supply, the output terminals 34 and 36, and the collector emitter circuit of the transistor 166.

In order to switch the bistable stage 72, from the ON to the OFF state, that is bias the transistor 166 OFF, the net polarity of the control ampere turns applied to amplifier 70 is reversed. This changes the polarity of the output of amplifier 70 across resistor 124, which in turn stops the conduction of the transistor 140, allowing the transistor 142 to conduct in its emitter collector circuit. Thus, bistable stage 72 is switched to the OFF state. In this state, transistor 166 is biased to cut off.

The bistable circuit of FIG. 2 responds to a direct current input signal, or an alternating current input signal of the same frequency as the supply voltage furnished by the transformer 114. For the alternating current input signal, the device responds to the component of the signal in phase with the supply voltage. Regardless of the type of input signal, the device has a direct current output of constant polarity for a given signal.

A more complete description of the bistable circuit of FIG. 2 may be had by reference to the U.S. patent application of Roland W. Roberts, S.N. 782,017, filed December 22, 1958. It should be understood that the particular bistable circuit shown in FIG. 2 is only illustrative, and that any suitable static bistable circuitry may be employed. Any suitable low-level static switching amplifier may be used.

The field power supplies F$g$ and F$m$ are similar and each may take the form of the detailed example shown in FIG. 3. Corresponding input and output terminals of the field power supplies F$g$, F$m$, and FIG. 3, bear the same reference numbers, except that for F$g$ and F$m$ the numbers are suffixed by $g$ and $m$, respectively. The circuit in FIGURE 3 is a conventional bridge type self-saturating magnetic amplifier biased to cutoff when there is no signal applied to its control input terminals 30 and 32. Included in the amplifier of FIG. 3 are saturable reactors 200 and 202 having load windings 204 connected with rectifiers 206 in a full wave bridge circuit providing full wave D.C. output at output terminals 26 and 28. Each saturable reactor also includes a control winding 212 and a bias winding 214. Control windings 212 are connected in series to control input terminals 30 and 32. The bias windings 214 are connected to a bias source to bias the amplifier to cutoff when there is no signal at the control input terminals. Power is supplied to the amplifier from a suitable A.C. source through power input terminals 216. From the polarity dots, it is apparent that a control voltage applied to the input terminals with a polarity making terminal 32 positive, will drive the amplifier up and provide a D.C. output at its output terminals. The self-saturating magnetic amplifier bridge circuit of FIG. 3 is well-known and requires no further explanation.

The connections between bistable circuit B$g$ and the field power supply F$g$ are arranged so that when the bistable stage B$g$ is ON its output drives power supply F$g$ up to a high output level, for example maximum ouput. On the other hand, when the bistable stage B$g$ is OFF, the output level of power supply F$g$ is driven to a lower level, for example cutoff. The same arrangement obtains between bistable circuit B$m$ and field supply F$m$. When the field power supply is turned on and off in response to the respective ON and OFF states of its driving bistable, the field power supply is actually performing as an amplifier of the bistable output. Thus, although field supplies F$g$ and F$m$ are shown as magnetic amplifiers other suitable amplifiers may be employed, such as thyratron, controlled semiconductor, etc.

As hereinbefore stated terminals of B$g$ and B$m$ which correspond to terminals in the example of FIG. 2, bear the same reference numerals suffixed by the identifying letter, $g$ or $m$, as the case may be. For example, terminals 110$g$ and 110$m$ correspond to terminal 110.

As seen in FIG. 1, a controllable D.C. reference source 220 is connected to the control input circuits 110$g$–112$g$ and 110$m$–112$m$ of bistable circuits B$g$ and B$m$ in a polarity direction that switch bistable B$g$ to the ON state and bistable B$m$ to the OFF state in the absence of signals at the other control inputs to the bistable circuits. The reference source 220 supplies a command speed signal that represents the desired speed, and in the disclosed example is proportional to the desired speed. The output of tachometer generator 60 representing motor speed is connected to the control inputs 106$g$–108$g$ and 106$m$–108$m$ of bistable circuits B$g$ and B$m$ in opposition to the signal from the reference source 220. Thus, the tachometer signals tend to switch the bistable B$g$ OFF and bistable B$m$ ON.

Whenever the output voltage of generator 10 exceeds a predetermined value, for example rated generator armature voltage, a circuit 222 supplies control input circuit 102$g$–104$g$ of bistable circuit B$g$ with a signal in the direction tending to turn off bistable B$g$. The circuit 222 is connected across the generator output leads 20 and 22 and includes a current limiting resistor 223 and a reference circuit 224 that comprises a diode 226 in series with a D.C. source in the form of an adjustable resistor 228 connected across a D.C. voltage supply 230. If desired, the reference 224 may be a Zener diode in which case, diode 226, potentiometer 228 and D.C. source 230 are replaced by the Zener diode. The reference circuit is arranged to supply a unidirectional bias opposed to the generator voltage. Whenever the generator voltage exceeds this bias value a signal will be supplied to the control input 102$g$–104$g$ in opposition to the signal from the reference source 220. Thus, the signal supplied by circuit 222 tends to drive the bistable circuit B$g$ to the OFF state. Resistor 223 is chosen such that whenever the generator voltage exceeds the predetermined value set by reference 224, the signal supplied by circuit 222 to the input circuit 102$g$–104$g$ is sufficiently large to override any other control signals and switch the bistable circuit B$g$ to the OFF state. In the absence of a control signal at control input 102$g$–104$g$, the error signal due to signals supplied to bistable B$g$ by the reference 220 and the tachometer generator 60 will switch the bistable circuit B$g$ to the ON state whenever the speed reference 220 (command) signal exceeds the tachometer signal, and to the OFF state whenever the tachometer signal exceeds the speed reference signal. Field power supply F$g$ is switched to the full ON condition in response to the ON state of bistable circuit B$g$. On the other hand, the OFF state output of bistable B$g$ switches field power supply F$g$ to the OFF state thus cutting off field power supply to the generator.

A circuit 232 provides a signal to control input 104$m$–102$m$ of bistable circuit B$m$ only when the generator voltage on lines 20–22 is less than a predetermined level set by a reference circuit 234 in the circuit 232. A current limiting resistor 233 is also included in the circuit 232. The reference circuit 234 includes a diode 236 and an adjustable resistor 238 connected across a supply source 240, and is arranged to supply a unidirectional bias opposed to the generator voltage. Until the generator voltage exceeds the bias value supplied by reference 234, a signal will be supplied by the circuit 232 to the control input 102$m$–104$m$ in a direction to set the bistable circuit B$m$ to the ON state. In the absence of a signal at input 102$m$–104$m$, command signals from reference source 220 and motor speed signals from the tachometer generator 60 are compared in the bistable circuit B$m$ to provide an error signal which sets this bistable to the OFF state when the command speed signal from reference 220 exceeds the tachometer 60 signal, and to the ON state when the tachometer signal is greater than the command speed (reference 220) signal. The reference circuit 234 may be set to provide the same reference bias value as the reference circuit 224, thus to cut off conduction through diode 236 and to force conduction through diode 226 in response to the same predetermined value of generator armature voltage. This provides a sharp cross-over between the high and low speed regulating modes. However, to provide a cross-over speed range or band between high and low speed control, the reference source 234 may be set to provide a bias value below that of reference 224.

The circuit constants and circuit and component parameters are arranged to provide the following operation: The speed of the motor is selected by the adjustable arm of the reference 220 which provides the command speed signal. In the low speed region, the generator 10 operates with relatively low average field excitation and consequently low armature voltage which is below the reference 224 and 234 voltages. Resistor 233 is chosen so that diode 236 conducts heavily and regardless of the error signal forces bistable circuit Bm ON, thereby to switch power field supply Fm to maximum output and in turn provide full field excitation to the motor field 50. The motor speed is regulated in the low speed range by means of armature control from the reference 220 signal input to bistable circuit Bg and the following closed loop: bistable circuit Bg—field supply Fg—generator field 24—generator armature 14—motor armature 16—tachometer generator 60—bistable circuit Bg. As long as the generator armature voltage is below the reference 224 voltage, diode 226 does not conduct.

At high speeds, when the generator armature voltage increases to the value set by the reference 224, diode 226 conducts and the reference circuit 224 in conjunction with bistable Bg, field supply Fg, generator field 24, and generator armature 14 forms a closed loop, series reference, voltage regulating system. The signal from the reference source 224 overrides the error input to bistable Bm, and the generator armature voltage is regulated to the value set by reference 224, independent of speed or load. In the meantime diode 236 is driven out of conduction when the generator voltage rises above the value set by reference source 234, and the high speed loop (bistable Bm—field supply Fm—motor field 50—motor armature 16—tachometer generator 60—bistable Bm) functions as a speed control system employing field weakening on the motor (motor field is weakened to increase speed).

If the references 224 and 234 are related to provide a cross-over speed range, then at a speed-load value requiring a generator armature voltage somewhat less than maximum or rated voltage, the system begins to depart from the low speed mode of operation. The adjustment of resistor 238 is such as to set reference source 234 to provide a bias of such value that diode 236 is driven out of conduction at a generator armature voltage that is less than rated value, for example 90% of rated armature voltage. When diode 236 is thusly driven out of conduction, the high speed loop Bm–Fm–50–16–60–Bm begins to function as a motor speed regulator by control of the motor field excitation. At the same time, the low speed loop Bg–Fg–24–14–16–60–Bg is still in operation. This overlap operation increases the system amplification in the speed region where the generator is approaching field saturation and the motor is coming out of field saturation, thus maintaining system gain where it tends to decrease because of decreased gain in both machines. The two regulating loops augment each other and compensate for tendency toward lowered system gain due to saturation in the motor and generator fields. The motor operates with nearly (90% in cited example) rated armature voltage before motor field control is started. This insures maximum torque capabilities in this speed range. As the speed is increased still further, generator armature voltage increases to rated value thus forcing conduction of diode 226, and the system reverts to the high speed mode of operation wherein diode 236 is driven out of conduction and the speed is controlled by the lower loop Bm–Fm– 50–12–60–Bm to the speed set by the command signal from reference source 220.

The motor and generator field time constants provide sufficient integration so that the oscillatory "dither" amplitudes in motor speed and generator armature voltages are small.

It is to be understood that the herein described arrangements are simply illustrative of the principles of the invention, and that other embodiments and applications are within the spirit and scope of the invention.

I claim as my invention:

1. A motor control circuit comprising a motor having an armature winding and a field winding, armature supply means for energizing said armature winding, field supply means for energizing said field winding, first static bistable means for controlling the armature supply means in response to motor speed and armature voltage, and second static bistable means for controlling the field supply means in response to motor speed and armature voltage.

2. The combination of claim 1 wherein at least one of said bistable means includes a magnetic amplifier responsive to deviation of the speed of said motor from a desired speed and to motor armature voltage, and bistable semiconductive switching means responsive to said amplifier.

3. A motor control circuit comprising a motor having an armature winding and a field winding, static bistable armature supply means for energizing the armature winding, static bistable field supply means for energizing the field winding, said armature supply means providing a particular level of armature excitation in response to one of its stable states and a lower level of armature excitation in response to the other of its stable states, said field supply means providing a first level of motor field excitation in response to one of its stable states and a second level of motor field excitation in response to the other of its stable states, the first level of motor field excitation producing a higher motor speed than the second level of motor field excitation, said armature supply means being arranged to assume its said one state in response to the speed of the motor being below a predetermined speed when the armature voltage is below a predetermined value, said armature supply means being arranged to assume its other state in response to the motor armature voltage being above said predetermined value or in response to the speed of the motor being above said predetermined speed when the armature voltage is below said predetermined value, said field supply means being arranged to assume its said one state in response to the speed of the motor being below a certain speed when the armature voltage is above a certain value, said field supply means being arranged to assume its other state in response to the armature voltage being below said certain value or in response to the speed of the motor being above said certain speed when the armature voltage is above said certain value.

4. The combination of claim 3 wherein at least one of the bistable means includes a magnetic amplifier responsive to deviation of the speed of said motor from a desired speed and to motor armature voltage, and bistable semiconductive switching means responsive to said amplifier.

5. The combination of claim 3 wherein said certain speed is greater than said predetermined speed, and said predetermined value is at least as great as said certain value.

6. A motor control circuit comprising a motor having an armature winding and a field winding, static bistable armature supply means for energizing the armature, static bistable field supply means for energizing the field winding, said armature supply means being ON when in one of its stable states and OFF when in its other stable state, said field supply means being ON when in one of its stable states and OFF when in the other of its stable states, the ON state of the field supply means producing a lower motor speed than the OFF state, said armature supply means being arranged to assume its said one state in response to the speed of the motor being below a predetermined speed when the armature voltage is below a predetermined value, said armature supply means being arranged to assume its other state in response to the motor armature voltage being above said predetermined value or in response to the speed of the motor being above said predetermined speed when the armature voltage is below said predetermined value, said field supply means being arranged to assume its said one state in response to the armature voltage being below a certain value or in response to the speed of the motor being above a certain speed when the armature voltage is above said certain value, said field supply means being arranged to assume its other state in response to the speed of the motor being below said certain speed when the armature voltage is above said certain value, said certain speed being greater than said predetermined speed, said predetermined value being at least as great as said certain value.

7. A motor control circuit comprising a motor having an armature winding and a field winding, a generator having an armature winding and a field winding, said armature windings being coupled in a loop circuit, generator field supply means for energizing the generator field, motor field supply means for energizing the motor field, first and second static bistable means for respectively controlling the generator and motor field supply means, said generator field supply means being ON in response to one stable state of the first bistable means and OFF in response to the other stable state of the first bistable means, said motor field supply means being ON in response to one stable state of the second bistable means and OFF in response to the other stable state of the second bistable means, the ON state of the motor field supply means producing a lower motor speed than the OFF state, said first bistable means being arranged to assume its said one state in response to the speed of the motor being below a predetermined speed when the generator armature voltage is below a predetermined value, said first bistable means being arranged to assume its other state in response to the generator armature voltage being above said predetermined value or in response to the speed of the motor being above said predetermined speed when the generator armature voltage is below said predetermined value, said second bistable means being arranged to assume its said one state in response to the generator armature voltage being below a certain value or in response to the speed of the motor being above a certain speed when the generator armature voltage is above said certain value, said second bistable means being arranged to assume its other state in response to the speed of the motor being below said certain speed when the generator armature voltage is above said certain value, said certain speed being greater than said predetermined speed, said predetermined value being at least as great as said certain value.

8. A motor control circuit comprising a motor having an armature winding and a field winding, a generator having an armature winding and a field winding, said armature windings being coupled in a loop circuit, generator field supply means for energizing the generator field, motor field supply means for energizing the motor field, first and second static bistable means for respectively controlling the generator and motor field supply means, said generator field supply means providing a particular level of generator field excitation in response to one stable state of the first bistable means and a lower level of generator field excitation in response to the other stable state of the first bistable means, said motor field supply means providing a first level of motor field excitation in response to one stable state of the second bistable means and a second level of motor field excitation in response to the other stable state of the second bistable means, the first level of motor field excitation producing a higher motor speed than the second level of motor field excitation, said first bistable means being arranged to assume its said one state in response to the speed of the motor being below a predetermined speed when the generator armature voltage is below a predetermined value, said first bistable means being arranged to assume its other state in response to the generator armature voltage being above said predetermined value or in response to the speed of the motor being above said predetermined speed when the generator armature voltage is below said predetermined value, said second bistable means being arranged to assume its said one state in response to the speed of the motor being below a certain speed when the generator armature voltage is above a certain value, said second bistable means being arranged to assume its other state in response to the generator armature voltage being below said certain value or in response to the speed of the motor being above said certain speed when the generator armature voltage is above said certain value, said certain speed being greater than said predetermined speed, said predetermined value being at least as great as said certain value.

9. The combination of claim 8 wherein at least one of said bistable means includes a magnetic amplifier responsive to deviation of the speed of said motor from a desired speed and to generator armature voltage, and bistable semiconductive switching means responsive to said amplifier.

10. A motor control circuit comprising a motor having an armature winding and a field winding, static bistable armature supply means for energizing the armature winding, static bistable motor field supply means for energizing the field winding, said armature supply means providing a particular level of armature excitation in response to one of its stable states and a lower level of armature excitation in response to the other of its stable states, said motor field supply means providing a first level of motor field excitation in response to one of its stable states and a second level of motor field excitation in response to its other stable state, the first level of motor field excitation producing a higher motor speed than the second level of motor field excitation, means for providing a reference signal A, means for providing a reference signal B, means for providing a reference signal C, means for providing a signal D proportional to the speed of said motor, means for providing a signal E proportional to the motor armature voltage, the armature supply means assuming its one stable state in response to $A>D$ and $B>E$, and its other stable state in response to $E>B$ or to $D>A$ and $B>E$, the motor field supply means assuming its one stable state in response to $A>D$ and $E>C$, and its other stable state in response to $C>E$ or to $D>A$ and $E>C$.

11. The combination of claim 10 wherein at least one of said bistable means includes a magnetic amplifier responsive to motor speed and motor armature voltage, and bistable semiconductive switching means responsive to said amplifier.

12. The combination of claim 10 wherein signal B is at least as great as signal C.

13. A motor control circuit comprising a motor having an armature winding and a field winding, static bistable armature supply means for energizing the armature winding, static bistable motor field supply means for energizing the field winding, said armature supply means being ON when in one of its stable states and OFF when in the other of its stable states, said motor field supply means being OFF when in one of its stable states and ON when in the other of its stable states, the ON state of the field supply means producing a lower motor speed than the OFF state, means for providing a reference signal A, means for providing a reference signal B, means for providing a reference signal C, means for providing a signal D proportional to the speed of said motor, means for providing a signal E proportional to the motor armature voltage, the armature supply means assuming its one stable state in response to $A>D$ and $B>E$, and its other stable state in response to $E>B$ or to $D>A$ and $B>E$, the motor field supply means assuming its one stable state in response to $A>D$ and $E>C$ and its other stable state in response to $C>E$ or to $D>A$ and $E>C$, signal B being at least as great as signal C.

14. A motor control circuit comprising a motor having an armature winding and a field winding, a generator having an armature winding and a field winding, said armature windings being coupled in a loop circuit, generator field supply means for energizing the generator field, motor field supply means for energizing the motor field, first and second static bistable means for respectively controlling the generator and motor field supply means, said generator field supply means providing a particular level of generator field excitation in response to one stable state of the first bistable means and a lower level of generator field excitation in response to the other stable state of the first bistable means, said motor field supply means providing a first level of motor field excitation in response to one stable state of the second bistable means and a second level of motor field excitation in response to the other stable state of the second bistable means, the first level of motor field excitation producing a higher motor speed than the second level of motor field excitation, means for providing a reference signal A, means for providing a reference signal B, means for providing a reference signal C, means for providing a signal D proportional to the speed of said motor, means for providing a signal E proportional to the armature voltage of the generator, first control means responsive to the signals A, D, B and E for controlling the first bistable means, said first control means being responsive to $A<D$ and $B>E$ to operate the first bistable to its said one state, said first control means being responsive to $E>B$ or to $D>A$ and $B>E$ to operate the first bistable to its other state, second control means responsive to signals A, D, C and E for controlling the second bistable, the second control means being responsive to $A>D$ and $E>C$ to operate the second bistable to its said one state, and to $C>E$ or to $D>A$ and $E>C$ to operate the second bistable to the second state, signal B being at least as great as signal C.

15. The combination of claim 14 wherein at least one of said bistable means includes a magnetic amplifier responsive to motor speed and generator armature voltage, and bistable semiconductive switching means responsive to said amplifier.

References Cited by the Examiner

UNITED STATES PATENTS

| 2,783,424 | 2/57 | Fath et al. | 318—154 X |
| 2,813,244 | 11/57 | Guggi. | |
| 2,886,763 | 5/59 | Zelina | 322—25 |
| 2,886,764 | 5/59 | Zelina | 322—25 |
| 2,929,983 | 3/60 | Abell | 318—145 |
| 3,022,453 | 2/62 | Jones | 318—154 |
| 3,079,539 | 2/63 | Guerth | 318—341 X |
| 3,095,530 | 6/63 | Woodward | 318—145 |

FOREIGN PATENTS 802,184 10/58 Great Britain.

OTHER REFERENCES

German Application, 1,072,693, Jan. 7, 1960.

Corey, P. D., and Hansen, Wo. O.: A Transistorized D-C Voltage Regulator for Direct Replacement of Carbon-Pile Regulators, in AIEE Conference Paper, Dec. 15, 1959, Paper Number CP 60–195.

ORIS L. RADER, *Primary Examiner.*